2,773,102

TREATMENT OF BENZENE HEXACHLORIDE

John T. Clarke and Hoyt J. Cragg, Baton Rouge, La., assignors to Ethyl Corporation, New York, N. Y., a corporation of Delaware No Drawing. Application July 19, 1952,
Serial No. 299,913

1 Claim. (Cl. 260—648)

This invention relates to the treatment of a mixture of benzene hexachloride isomers to enhance the gamma concentration therein and more particularly to a process for extracting and crystallizing a high-gamma isomer benzene hexachloride product.

It is known that benzene hexachloride (1,2,3,4,5,6-hexachlorocyclohexane), hereinafter called BHC, occurs in a number of isomeric forms. For example, in the addition chlorination of benzene, at least five such isomers are formed having approximately the following weight distribution: alpha, 65 percent; beta, 8 percent; gamma, 13 percent; delta, 10 percent; epsilon, less than one percent; and the remainder, heptachlorocyclohexanes and other impurities. It is also known that the gamma isomer is by far the most insecticidally active BHC isomer. Accordingly, it is desirable to concentrate isomer mixtures with respect to the gamma isomer to facilitate preparation of improved insecticidal formulations by the elimination of inert isomers and odoriferous constituents thereof.

Prior methods have been disclosed for concentrating the gamma isomer in BHC isomer mixtures by extraction and fractional crystallization using a solvent having different solubilities for the various BHC isomers. Most of these methods have employed essentially isothermal conditions, i. e., extraction and crystallization carried out at the same temperature. In these isothermal processes, the extract is concentrated by removing a quantity of the solvent prior to crystallization. In these prior processes, the extraction and crystallization of the BHC mixture is normally conducted at low temperatures, between about 0°–15° C., and the extract solution is concentrated at the boiling point.

The above process has been found unsatisfactory in at least three major respects. First, the concentration operation, requiring long residence periods at the boiling point of the solvent, results in the formation of hydrogen chloride, due to decomposition of BHC. The resulting solution is extremely corrosive, complicating operation and requiring the use of costly corrosion-resistant equipment throughout the process. The boiling required for solvent removal also removes dissolved oxygen which normally acts as a corrosion inhibitor.

Methanol, which is a common solvent for the above process, has incidental disadvantages due to its toxicity and inflammability.

The above process also gives a relatively low purity gamma BHC product, low yields or both. The yields and purity of the product are limited by the delta isomer and other highly soluble impurities in the crude BHC. For example, when crude BHC is extracted with methanol, the degree of concentration and temperature reduction (and solvent depressant addition, such as water) may be adjusted and combined to obtain essentially any desired yield of the gamma BHC. However, it is generally preferred to limit the gamma crystallization, following extraction, to a point wherein the delta BHC is just saturated in the crystallizing solution. Further crystallization of gamma BHC will result in co-crystallization of the delta isomer. The latter product cannot easily be further purified with respect to gamma BHC due to the presence of the delta isomer. It is thus apparent that with prior processes the gamma/delta solubility in any solvent determines the maximum yield of a relatively high purity product which can be obtained from crude BHC.

The prior processes generally require low temperature operation as noted above, further complicating operation of the process and necessitating expensive process equipment. When room temperatures or higher are employed for extraction and more particularly for crystallization, the yield and product purity is untenably low.

It is accordingly an object of this invention to provide an improved process for treating a mixture of benzene hexachloride isomers to enhance the gamma isomer concentration therein and to recover the gamma isomer in high yields.

Another object of this invention is to provide a process of the above type in which substantial concentration of the gamma isomer relative to the alpha isomer may be obtained under equilibrium conditions, but which is also adapted to be carried out to obtain preferential crystallization of gamma BHC in a rate process.

Another object is to provide a process for eliminating the relatively soluble delta isomer so as to permit high recoveries of a high purity gamma product.

Another object of this invention is to provide a process employing conditions at which benzene hexachloride is stable and employing a solvent which inhibits benzene hexachloride decomposition and which has relatively low toxicity and low flammability characteristics.

Another object of this invention is to provide a process which may be readily and easily controlled in large scale commercial operation.

Other objects and advantages of this invention will become apparent as the description proceeds.

It has now been discovered that the solubility of the benzene hexachloride isomers in certain polar solvents varies considerably with variations in temperature, and the gamma solubility varies at a greater rate than any of the other isomers. Accordingly, with these solvents, the BHC may be extracted at relatively high temperatures, and the extract subsequently cooled to crystallize a product having a high-gamma purity. For example, when extracting BHC with controlled quantities of certain polar solvents at relatively high temperatures, both alpha and gamma isomers can be saturated in the extract, whereas, upon equilibrium crystallization at a lower temperature, the crystallized product is substantially enriched in gamma isomer. This purification of a high-gamma isomer product can be obtained using equilibrium crystallization conditions, but preferably, the crystallization is carried out using controlled crystallization conditions to produce even greater preferential crystallization of the gamma isomer relative to the other BHC isomers and other impurities in the feed material.

The temperature of extraction can be between 50°–120° C., and preferably, the extraction temperature is between 80°–110° C. Optimum extraction is obtained with isomer mixtures having a relatively low delta/gamma weight ratio when the temperature is maintained between 95°–108° C. Lower extraction temperatures are generally preferred when isomer mixtures having higher weight ratios are extracted, i. e., above about 0.3 delta/gamma weight ratio.

The crystallization can be conducted over a temperature range of between (−15) and 90° C., with the final crystallization being preferred between about 20°–80° C. While the broad temperature ranges for extraction and crystallization overlap, in every case the crystallization is carried out at a lower temperature than the extraction temperature. The crystallization may be induced by quick cooling or uniform or non-uniform slow cooling. However, it is more preferred to carry out the crystallization step-wise, using two or more crystallization temperatures. For example, highly beneficial results can be obtained by extraction between 95°–108° C., cooling to a temperature between 75°–80° C. to effect partial crystallization of the gamma isomer, and thereafter cooling to a temperature between about 20°–45° C. to complete the crystallization of the high-gamma isomer fraction. In the latter case, the entire crystallization product from the two-stage crystallizers may be recovered together, but, preferably, the crystallized products at the different crystallizing temperatures are recovered separately, since the product of the higher temperature crystallization is generally of a higher purity than the product obtained under the lower temperature crystallizing conditions.

While lower temperatures of crystallization are suitable, i. e. below room temperature, refrigeration problems normally make such operation undesirable. Generally, it is preferred to crystallize the high-gamma product at about room temperature.

It is frequently desired to extract the highly soluble delta isomer and heptachlorocyclohexane isomers which are more soluble than gamma benzene hexachloride from the benzene hexachloride isomer mixture prior to extraction and crystallization of the gamma isomer so as to permit higher yields and purities of the gamma isomer product. The temperature of this extraction is preferably about the same as the temperature disclosed above with respect to crystallization, i. e., between (−15° C.) and 90° C. and preferably about 30° C. In this operation, to remove the delta isomer, only sufficient solvent is employed to dissolve the delta isomer contained in the benzene hexachloride isomer mixture to be extracted or, at least a part of the delta isomer present therein. If desired, advantage may be taken of the high rate of solution of the delta isomer to obtain a high purity delta isomer filtrate by limiting the residence time in the extractor and effecting separation of the phases prior to attainment of equilibrium.

The solvents which have been found suitable for the present invention are relatively high boiling compounds having a plurality of polar-functional groups. Compounds having two polar-functional groups are preferred. The desired polar-functional groups are as follows:

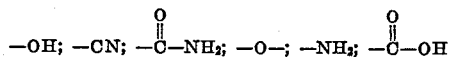

and

A solvent suitable for this invention can have two or more of any one of the groups, or can have any of these groups combined. For example, the —O— linkage can be combined in the molecule with —CN; —OH; or —NH$_2$. All of the above groups when combined with a similar group or one of the other polar groups provide solvents having a relatively high solubility temperature coefficient while providing low alpha/gamma solubility ratios at relatively high temperatures and high delta/gamma solubility ratios at low temperatures. For this reason, the gamma isomer may be efficiently separated from the delta isomer at low temperatures and from the alpha isomer at high temperatures with great efficiency, while still permitting considerable recovery of the gamma isomer in cooling the gamma isomer-containing solution from the extracting temperature to a lower crystallizing temperature.

Typical examples of suitable solvents are ethylene glycol; diethylene glycol; diethylene glycol monomethyl ether; diethylene glycol monoethyl ether; diethylene glycol monobutyl ether; B,B'-oxydipropionitrile; trimethylene glycol; propane 1,2-diol; propane 1,3-diol; butane 1,2-diol; butane 1,3-diol; butane 1,4-diol; 1,2,3,4-butanetetrol; diacetone alcohol; aldol; acetyl acetone; monoethanol amine; lactic acid; glycollic acid; and the like.

Some compounds having a single polar-functional group tend to associate to give solvents which are equivalent to poly-functional compounds. For example, formamide, dimethyl formamide, and B,B'-dichloroethylether have solubility characteristics with benzene hexachloride similar to the poly-functional compounds of the present invention and are thus suitable as solvents therefor.

The most preferred process of this invention provides a means for continuously removing impurities from isomer mixtures which are both more soluble and less soluble than the gamma isomer of BHC. This preferred process comprises pre-extracting at low temperatures the delta isomer and other high soluble constituents wherein the solubility ratio of delta/gamma is, for example, between 5 and 10:1, and discarding these constituents as a filtrate. In this pre-extraction, only sufficient solvent is employed to remove the highly soluble materials, such as the delta and epsilon isomers and certain heptachlorocyclohexanes. The cake from this pre-extraction is then extracted with fresh solvent at a higher temperature, wherein the gamma/alpha ratio of solubility is high relative to low temperature solubility ratios. Only sufficient solvent is used in this latter extraction to remove the gamma isomer, while leaving substantial quantities of other isomers undissolved. The cake remaining after this extraction removes the alpha and beta isomers and other relatively insoluble constituents from the system. The filtrate from the latter extraction is then cooled to a lower temperature and allowed to crystallize. The cake, upon separation, is the high gamma isomer product and the mother liquor is used to pre-extract the fresh benzene hexachloride isomeric mixture. An example of the preferred process is illustrated in Example V.

The following table of the solubility of the gamma isomer in grams/gram of solvent and the solubility ratios of alpha/gamma and delta/gamma for various temperatures permits ready determination of optimum solvent/BHC weight ratios which can be used with various isomeric mixtures, solvents, and process temperature conditions.

TABLE 1

| Solvent | Temperature, °C. | Gamma | Alpha/ Gamma | Delta/ Gamma |
|---|---|---|---|---|
| Glycol | 20 | 0.006 | 0.50 | 7.1 |
| | 40 | 0.10 | 0.46 | 6.9 |
| | 60 | 0.022 | 0.36 | 4.9 |
| | 80 | 0.043 | 0.34 | 3.7 |
| | 100 | 0.10 | 0.29 | 2.4 |
| | 120 | 0.20 | 0.29 | 1.8 |
| Diethylene Glycol | 20 | 0.036 | 0.15 | 8.3 |
| | 40 | 0.076 | 0.16 | 5.7 |
| | 60 | 0.15 | 0.17 | 4.3 |
| | 80 | 0.29 | 0.17 | 3.4 |
| | 100 | 1.020 | 0.10 | 1.7 |
| Diethylene Glycol Monoethyl Ether | 20 | 0.091 | 0.27 | 5.9 |
| | 40 | 0.19 | 0.23 | 4.0 |
| | 60 | 0.38 | 0.21 | 2.9 |
| | 80 | 0.90 | 0.16 | 1.8 |
| | 100 | 4.00 | 0.79 | 0.63 |
| B,B',-Dichloroethylether | 20 | 0.30 | 0.18 | 1.1 |
| | 40 | 0.51 | 0.20 | 0.96 |
| | 60 | 0.90 | 0.22 | 0.85 |
| | 80 | 1.94 | 0.19 | 0.64 |
| | 100 | 7.00 | 0.10 | 0.32 |
| B,B',-Oxydipropionitrile | 20 | 0.11 | 0.17 | 4.5 |
| | 40 | 0.18 | 0.18 | 3.9 |
| | 60 | 0.34 | 0.18 | 3.3 |
| | 80 | 0.74 | 0.15 | 2.5 |
| | 100 | 3.2 | 0.066 | 1.1 |
| Formamide | 20 | 0.0042 | 0.30 | 4.4 |
| | 40 | 0.011 | 0.30 | 3.9 |
| | 60 | 0.026 | 0.31 | 3.8 |
| | 80 | 0.057 | 0.31 | 3.7 |
| | 100 | 0.13 | 0.26 | 2.8 |

When desired, water or other solvent depressants can be added to the solvent to lower the solubility of all of the benzene hexachloride isomers and heptachlorocyclohexane isomers therein. In many cases, relatively low solvent capacity systems are desired so as to reduce the gamma isomer loss in separation techniques. For example, after extraction of the gamma isomer from the high alpha isomeric mixture, a quantity of liquid necessarily is held-up by the low gamma isomer cake during the separation of phases. Accordingly, the lower the solvent capacity of the solvent, the lower the gamma isomer loss in the separation operation.

The following are typical examples which illustrate the features of the present invention. All quantitative units in the following examples are given as parts by weight.

*Example I*

A crude isomeric mixture of benzene hexachloride (300 parts), containing 13 percent gamma isomer, was extracted at 90° C. with 682 parts of ethylene glycol. After equilibrium was obtained, the solid and liquid phases were separated and the cake continued 1.8 percent of gamma isomer, corresponding to 10.3 percent of the original gamma isomer in the benzene hexachloride mixture. The high gamma isomer filtrate was then cooled to 60° C. and allowed to crystallize. A crystalline product was obtained having a 66.2 percent gamma isomer purity in a yield of 31.8 percent of the original gamma isomer.

*Example II*

Example I was repeated except that the filtrate was cooled to 25° C. A crystalline product was obtained having a gamma isomer purity of 61.9 percent in a yield of 64.3 percent based on the original gamma isomer in the crude isomeric mixture.

*Example III*

Example I was repeated except that the filtrate was cooled to 0° C. A crystalline product was obtained having a gamma isomer purity of 60.1 percent representing a 74.5 percent recovery of the original gamma isomer from the crude isomeric mixture.

*Example IV*

A crude isomeric mixture of benzene hexachloride (300 parts), having 13 percent by weight gamma isomer, was extracted at 80° C. with 880 parts of ethylene glycol. After equilibrium was obtained, the solid and liquid phases were separated. The undissolved solids contained 2.5 percent of the gamma isomer, 11.5 percent loss of the original gamma isomer in the crude isomeric mixture. The high gamma isomer filtrate was then cooled to 25° C. The crystalline product had a purity of 59.4 percent gamma isomer in a yield of 61.5 percent of the original gamma isomer.

*Example V*

An isomeric mixture of benzene hexachloride (300 parts) containing 13 percent gamma isomer, 65 percent alpha isomer and 10 percent delta isomer was extracted with 300 parts of ethylene glycol at 30° C. This slurry was agitated for two hours to effect equilibrium. The liquid A and solid B phases were separated. The filtrate A containing the delta isomer was discarded. Fresh glycol (286 parts) was added to the cake B. This slurry was agitated at 100° C. for two hours and the phases C (solid) and D (liquid) were then separated. This cake C was then washed with 300 parts of fresh ethylene glycol at 100° C., producing solid E and filtrate F. The cake E was discarded (190 parts of benzene hexachloride) containing 11.9 percent of the original gamma isomer and the filtrate F was retained. Filtrate D was cooled to room temperature (30° C.) and centrifuged forming a high gamma cake DD and a filtrate EE.

In the second cycle, filtrate F was slurried with 285 parts of technical benzene hexachloride at 30° C. for two hours and centrifuged, washed and separated into filtrate G and cake H. Filtrate G was discarded. To cake H, the filtrate EE plus 40 parts of fresh ethylene glycol was added and slurried for two hours at 100° C. and centrifuged into a cake I and a filtrate J. Cake I was washed with 300 parts of glycol at 100° C. giving cake K and filtrate L. Filtrate J was cooled at 30° C. and a high gamma cake M was formed. This process was carried through 4 cycles in which low gamma cake K is analogous to cake E and high gamma cake M is analogous to cake DD. The results of these four cycles is given in the following table.

| Cycles | Tech. BHC, Parts | High gamma cake | | Low gamma cake | |
|---|---|---|---|---|---|
| | | Parts recovered | Percent gamma purity | Parts recovered | Percent gamma purity |
| First cycle | 300 | 33 | 70.7 | 190 | 2.4 |
| Second cycle | 285 | 41.5 | 70.5 | 201 | 3.0 |
| Third cycle | 300 | 38.0 | 70.1 | 200 | 3.3 |
| Fourth cycle | 300 | 37.0 | 70.7 | 201 | 2.4 |
| Total | 1,185 | 149.5 | | 792 | |

The BHC filtrate (108 parts), obtained in the low temperature extraction of the delta isomer, contained 31 percent gamma BHC and was discarded. Thus, 23 parts of gamma benzene hexachloride (23 percent of the original gamma) were discarded in the glycol; 22 parts (15 percent) of the gamma benzene hexachloride were discarded in low gamma cake; giving a 70 percent recovery of 70 percent gamma benzene hexachloride.

When ethylene glycol is substituted in any of the above examples by any of the other polar solvents noted above, similar results are obtained. Other polyhydric alcohols, for example, when substituted for glycol give highly efficient separation of the gamma isomer from the more soluble delta isomer and/or from the lessor soluble alpha isomer. Ether derivatives, such as diethylene glycol, are exceptionally suited for separation of the delta isomer at temperatures below about 80° C. and particularly below about 30° C. At the same time, the alpha solubility in these solvents is very low at temperatures above about 100° C. Also, diethylene glycol monoethyl ether, when substituted for ethylene glycol in any of the above examples gives similar results.

The ethylene glycol solvent in the above examples can also be substituted by B,B'-dichloroethylether, B,B'-oxydipropionitrile, formamide or similar compounds while obtaining highly satisfactory results.

It is believed apparent from the foregoing that the present process permits gamma isomer recoveries and product purities higher than those heretofore known. The present invention takes advantage of the relatively great difference in solubility of the gamma isomer with temperature change in solvents having a plurality of polar groups, and also takes advantage of the large temperature coefficient of solubility of the gamma isomer relative to the other undesired isomers in these solvents.

The process also avoids benzene hexachloride decomposition conditions by elimination of the requirement of solvent concentration. Thus, oxygen normally dissolved in the solvent is retained in the system to inhibit corrosion, rather than being boiled off in a concentration or flashing operation as in prior processes. Also, solvents useful in the present process, such as ethylene glycol, tend in themselves to inhibit decomposition of the BHC.

The extraction and crystallization process of the present invention, employing a high boiling solvent having a plurality of polar-functional groups, can be conveniently and readily combined with a benzene chlorination process to eliminate several costly and difficult recovery steps heretofore necessary in the recovery of crude BHC. It is presently common practice to recover the crude BHC from benzene reactor solution by flashing, steam distilling, or otherwise vaporizing the benzene, and thereafter drum casting or drying the BHC product. When flashing the benzene and recovering the product by drum casting, for example, the molten BHC is transferred from the flash vaporizer to the drum caster through a liquid seal so as to minimize benzene loss. However, even when observing the best known precautions, large quantities of valuable benzene are lost with or dissolved in the BHC. This loss of benzene is frequently as much as 75–100 percent of stoichiometric quantities. In addition, considerable operational difficulties are experienced due to freezing or crystallizing of the BHC during transfer. In the subsequent processing of the crude BHC to obtain a concentrated gamma isomer product, this recovered crude BHC must be at least partially redissolved or extracted with a second solvent, such as methanol.

These several process steps may be simplified or partially eliminated when employing a high boiling solvent for separating the BHC isomers, as in the present invention. For example, the ethylene glycol or other similar solvent may be added during vaporization of the benzene to dissolve all or part of the crude BHC to facilitate removal of the recovered product. Thus, the BHC may be recovered from the benzene vaporizer as a solution or as a slurry. In either case, freezing of the BHC in the transfer conduits from the vaporizer is greatly minimized or eliminated. In addition, due to the relative immiscibility between benzene and polar solvents, such as ethylene glycol, and the consequent greater drying potential of such systems, considerably better separation of the BHC and benzene can be obtained. For these reasons, very little if any benzene is lost in the BHC recovery operation.

The use of this improved recovery technique eliminates the need for a drum caster or drying apparatus. In addition, when the quantities of solvent fed to the flash vaporizer are controlled, the unit can serve the dual purpose of providing both a vaporizing vessel and a redissolving or extracting vessel. Along with the saving in costly equipment, serious material handling and operational difficulties are completely avoided. The presence in the flash vaporizer of ethylene glycol, as noted above, also inhibits the decomposition of BHC, such as to trichlorobenzene.

The polar solvent can also be used as a heat transfer agent to effect vaporization of the benzene. Thus, the polar solvent can be fed into the reactor solution either as a hot liquid or as a vapor so as to obtain direct heat transfer to the benzene to cause vaporization thereof. With high boiling polar solvents, only relatively small quantities of the polar solvent pass off with the benzene and even these small quantities can be subsequently recovered by phase separation.

We claim:

A process for enhancing the gamma isomer concentration of a benzene hexachloride isomer mixture containing the gamma isomer, comprising extracting the gamma isomer from said mixture with ethylene glycol, cooling the extract obtained therefrom to effect crystallization of an enhanced gamma isomer benzene hexachloride product and recovering said product, the extraction being carried out at a temperature above about 80° C.

References Cited in the file of this patent

UNITED STATES PATENTS

| | | |
|---|---|---|
| 2,438,900 | Cooke et al. | Apr. 6, 1948 |
| 2,573,676 | Campbell | Nov. 6, 1951 |
| 2,585,898 | Kauer | Feb. 12, 1952 |
| 2,603,664 | Burrage | July 15, 1952 |

OTHER REFERENCES

Slade: "Chemistry and Industry," October 1945, pages 315–6.